May 30, 1944.  E. A. LUXENBERGER  2,350,175
VULCANIZING APPARATUS
Filed Aug. 3, 1940  7 Sheets-Sheet 2
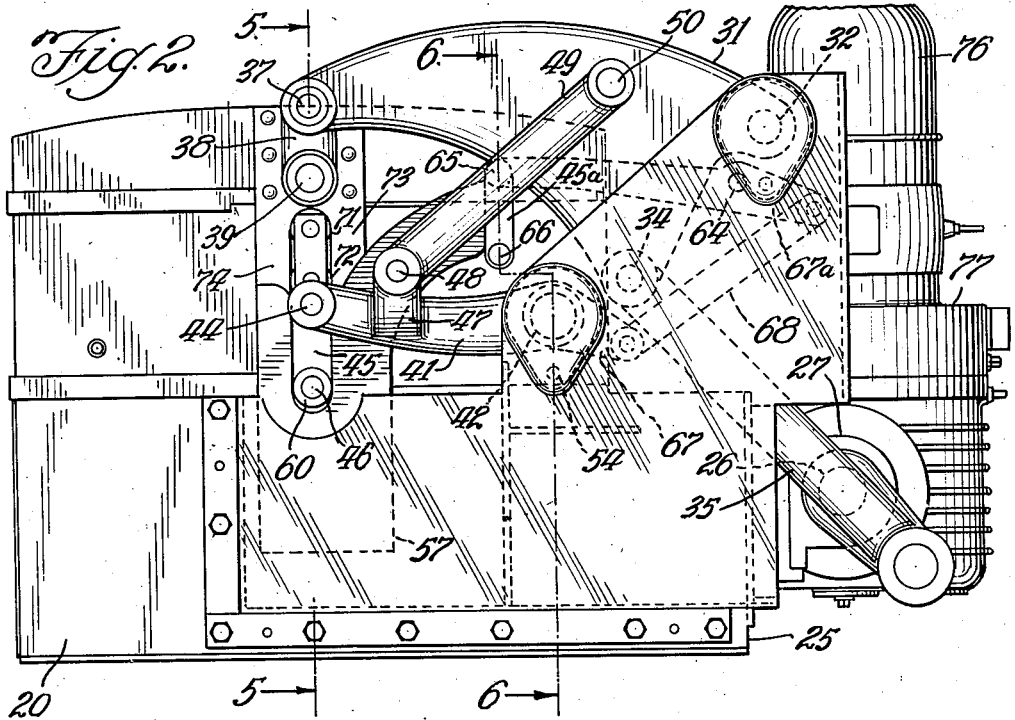
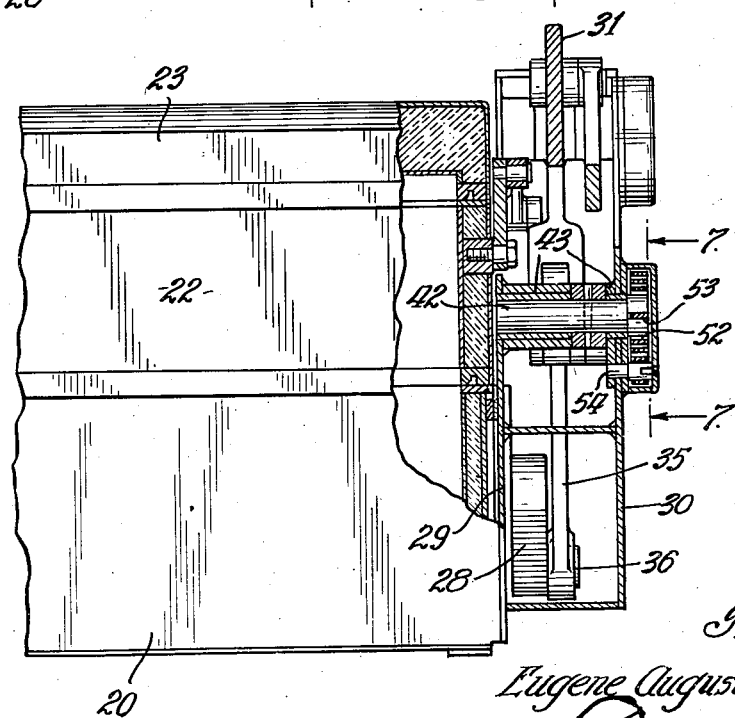
Inventor:
Eugene Augustus Luxenberger
By Eugene M. Giles atty.

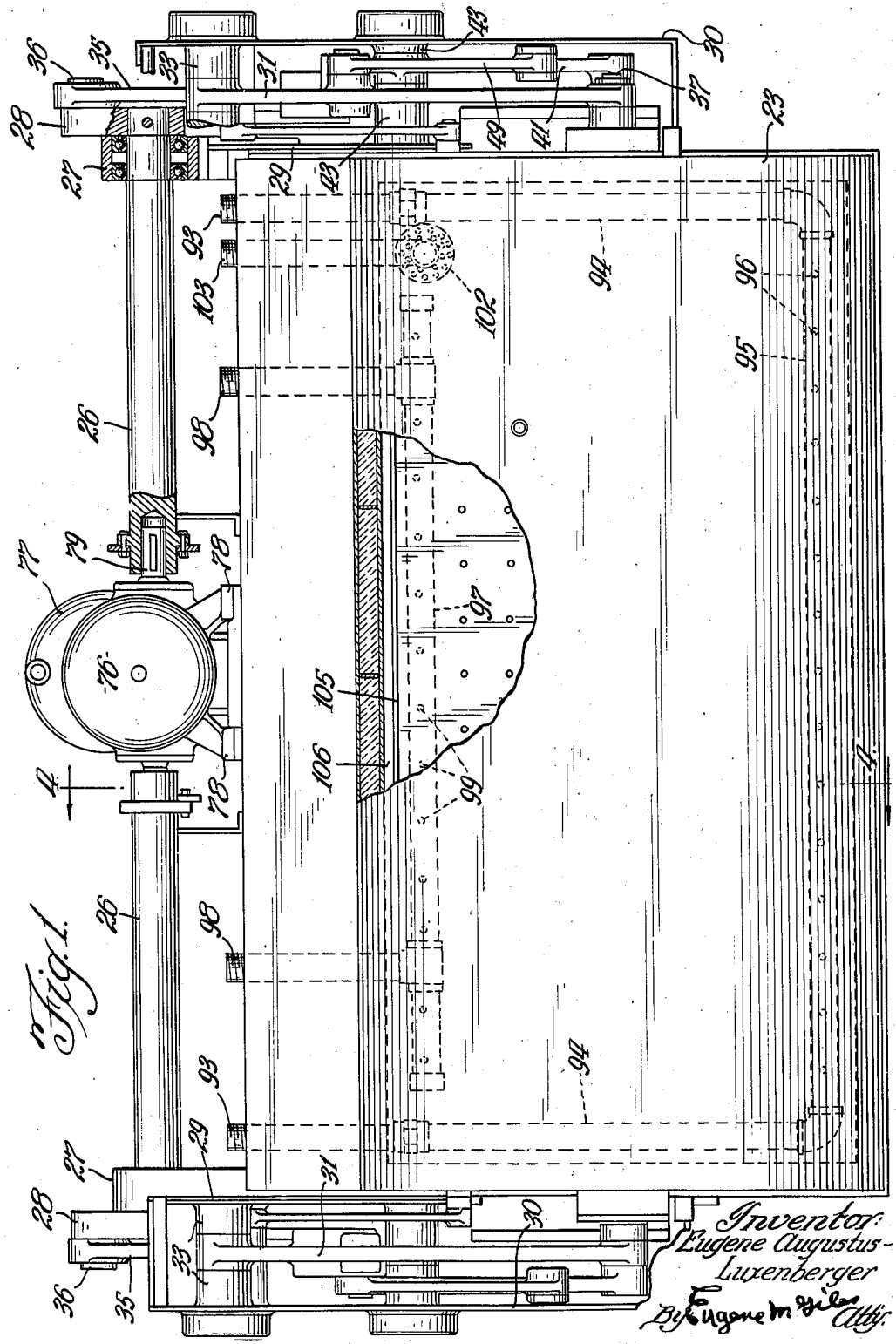

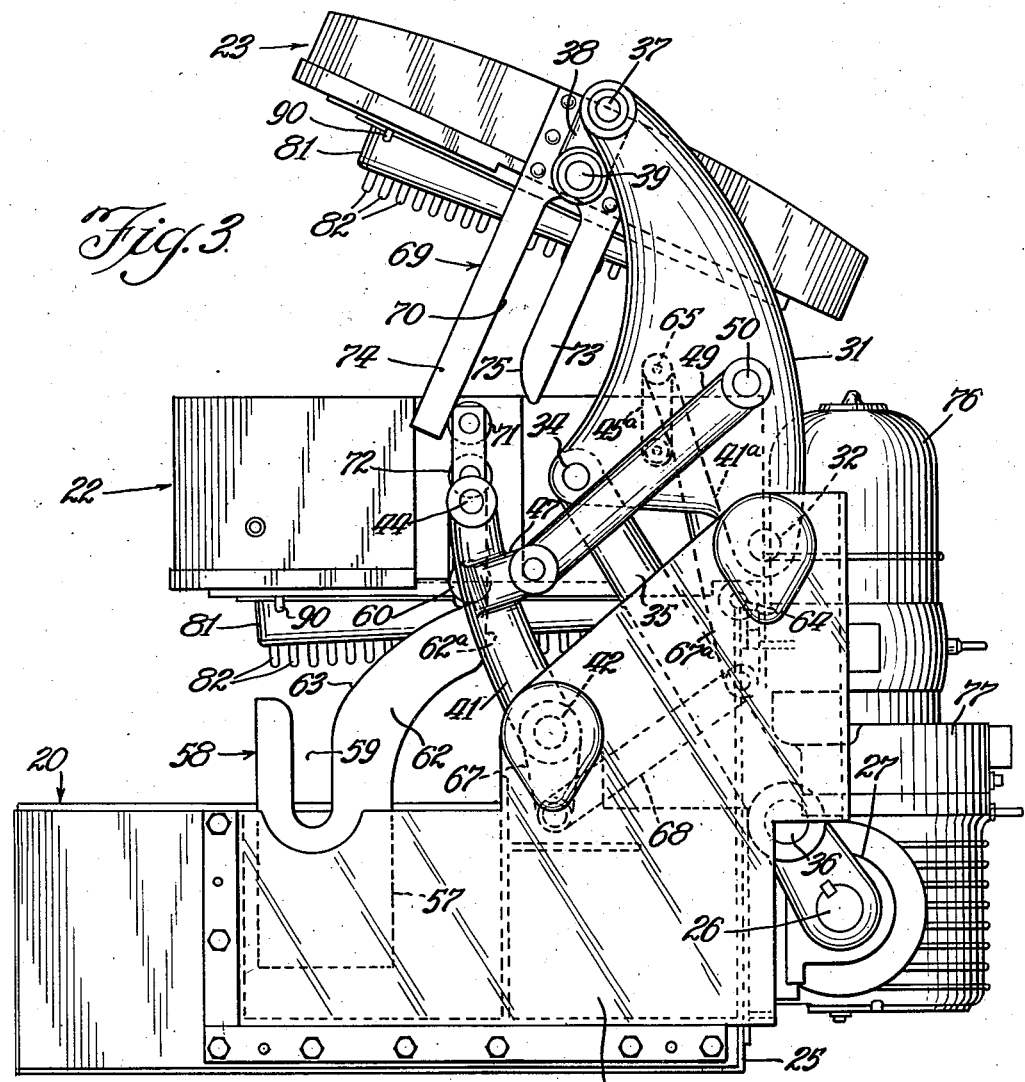

May 30, 1944. E. A. LUXENBERGER 2,350,175
VULCANIZING APPARATUS
Filed Aug. 3, 1940 7 Sheets-Sheet 4

Inventor:
Eugene Augustus Luxenberger

May 30, 1944.     E. A. LUXENBERGER     2,350,175
VULCANIZING APPARATUS
Filed Aug. 3, 1940     7 Sheets-Sheet 5

Inventor:
Eugene Augustus Luxenberger
By Eugene M. Giles Atty.

May 30, 1944. E. A. LUXENBERGER 2,350,175
VULCANIZING APPARATUS
Filed Aug. 3, 1940 7 Sheets-Sheet 6
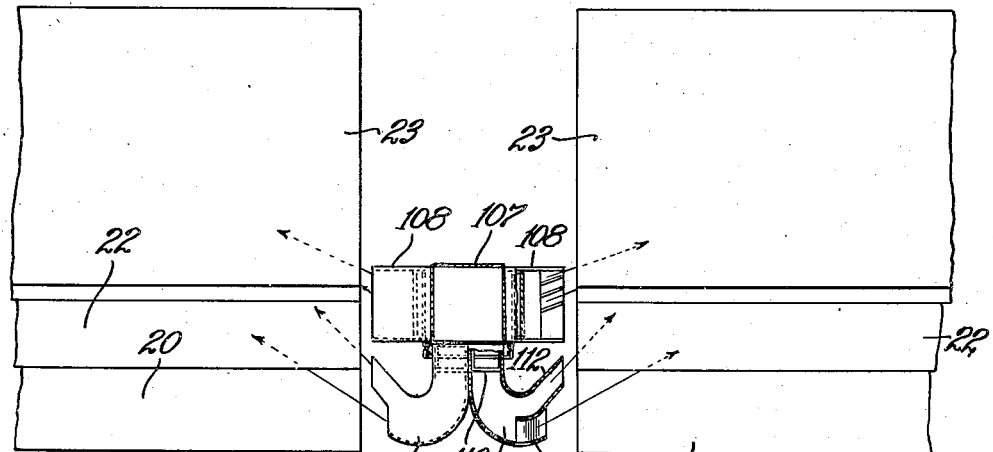
Fig. 8.
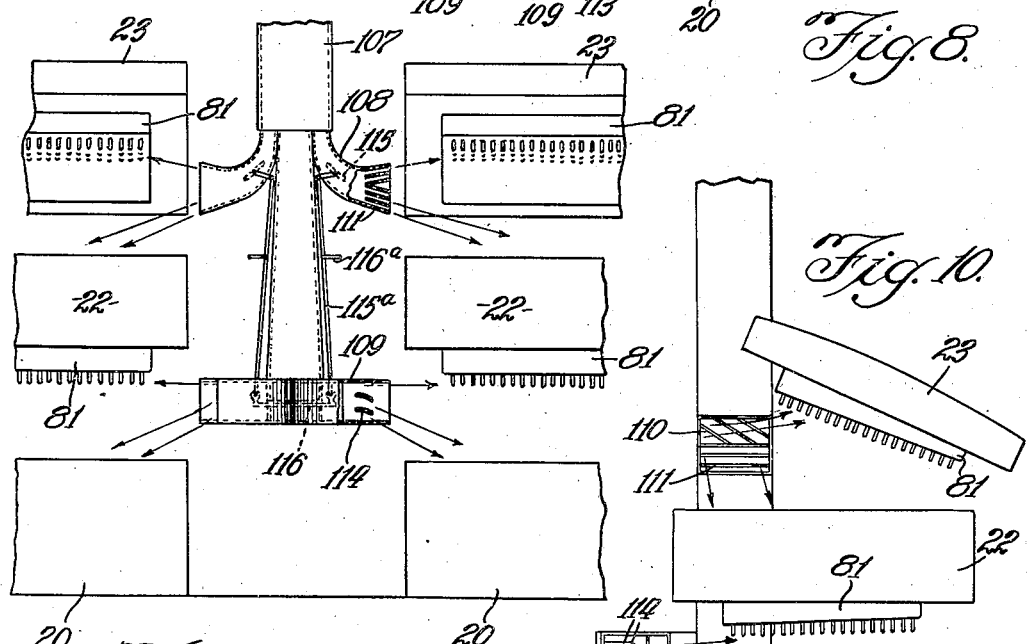
Fig. 9.  Fig. 10.
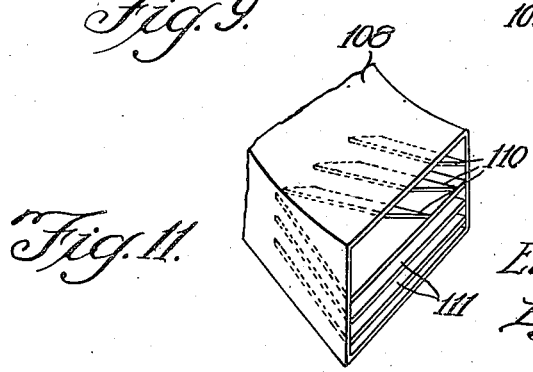
Fig. 11.
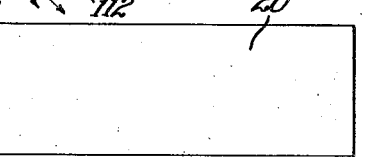
Inventor:
Eugene Augustus Luxenberger
By Eugene M. Giles Atty.

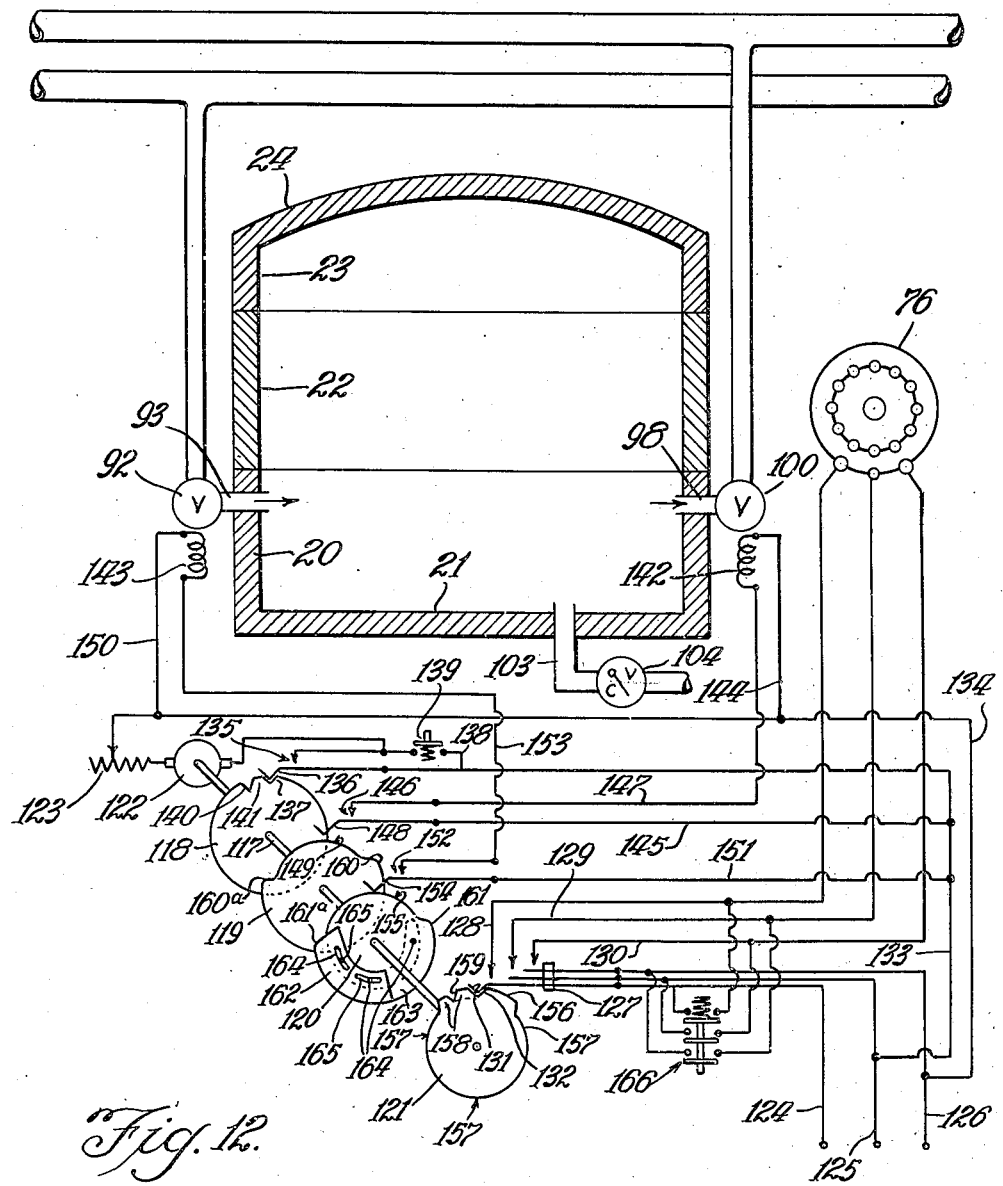

Patented May 30, 1944

2,350,175

UNITED STATES PATENT OFFICE 2,350,175

VULCANIZING APPARATUS

Eugene Augustus Luxenberger, Mishawaka, Ind., assignor to Mishawaka Rubber and Woolen Manufacturing Company, Mishawaka, Ind., a corporation of Indiana Application August 3, 1940, Serial No. 350,738

1 Claim. (Cl. 18—17)

My invention relates to the vulcanization of rubber articles and has reference more particularly to equipment whereby molded articles, such as cushions or mattresses of foamed or frothed latex, may be produced expeditiously with assurance of uniformity and perfection.

In the manufacture of cushions, mattresses and the like of foamed or frothed latex, large scale production has heretofore been quite difficult owing to the length of time required for vulcanization, the excessive amount of floor space and equipment and handling of equipment that was necessary, and the careful supervision that was constantly required to avoid faulty production and excessive losses.

In general two types of equipment have been employed in making molded articles of rubber, one of which involved individual or gang molds, which, after filling with the compounded rubber, were introduced into an oven or vulcanizer by which the molds and their contents were subjected to appropriate temperatures for the necessary length of time to cure the rubber and the other of which involved individual or gang molds, each with its own heating facilities, such as a steam jacket, incorporated in the mold and by which each mold and its contents were heated, neither of which types of equipment are efficiently or economically adaptable to the making of molded articles of latex foam, such as cushions, mattresses and the like.

These spongy rubber cushions of latex foam or the like are commonly made with a large number of elongated openings extending upward nearly or entirely through the cushion or mattress and produced by a corresponding large number of cores in the mold and the molds are not only quite large, heavy and unwieldy, but are also quite expensive. Moreover a great variety of shapes and sizes of cushions are required, not only because of the different shapes and sizes of cushions ordinarily used, but also because of changes which are frequently being made by those designing and using cushions, as for example automobile manufacturers, and as each different shape or size or change in cushions usually requires a different or new mold, the matter of mold costs is of paramount importance and likely to be prohibitive unless the mold turnover is quite rapid or the number of cushions produced per mold in a given time is quite large. Obviously also the vulcanizing, handling, and other facilities in connection with which the molds are used must be such as will contribute to rapidity of production and must also be suitable for or adaptable to the various shapes and sizes of molds and changes in molds that may be required from time to time.

Closely associated with the matter of mold costs is the amount or percentage of losses through faulty processing as any percentage of defective and unusable products that occurs not only is a loss or wastage of the time and material involved in the manufacture thereof, but necessarily requires additional molds and equipment to provide allowance for such percentage of defective or unusable production as is likely to occur.

Latex foam is a sensitive material, which must be handled carefully, especially immediately before, during and after gelling, at which time or times movement thereof causes it to fall and lose its intended low density, and it is also essential that prescribed conditions of treatment, from the pouring to the completion of the cure may be carefully, closely and uniformly adhered to not only to avoid losses and insure the desired unvarying standard of excellence for each and every cushion but also to expedite the cure and permit rapid output or turnover from the molds and accompanying equipment.

The particular conditions under which curing is accomplished are especially important as these cushions are quite large with relatively great thickness or depth of material into which heat penetration is ordinarily quite slow, especially in the aerated form of the rubber, such cushions requiring approximately two hours for vulcanization under usual vulcanizing conditions and of course necessitating an excessive number of molds even for small scale production. I have found, however, that by vulcanizing under certain conditions with careful and exact control thereof, vulcanization can be accomplished in greatly reduced time, even as little as twenty minutes, and of course this reduction of curing time permits an approximately six times greater mold turnover with an extraordinary saving in molds, equipment and floor space which relieves the manufacturer of such cushions of its greatest obstacle to successful large scale production. Naturally, in either case, the length of vulcanization time varies with the size of the cushions and the depth or thickness of material into which the heat must penetrate and also with the character of the compound, but the relative saving of time prevails irrespective of these factors.

Reverting now to the two types of equipment above referred to, which have been employed heretofore in making molded rubber articles, the first above mentioned type, namely the individual molds which after filling are introduced into an oven or vulcanizer, is not suitable for nor satisfactorily adaptable to the manufacture of latex foam cushions, not only because of the delay and loss of time necessarily occasioned in filling the batch of molds which the oven or vulcanizer accommodates and in transferring them thereto before vulcanization of any of the batch can be proceeded with, but also on account of the difficulty in spreading the work economically unless there are sufficient ovens or vulcanizers so that the time of the mold filling and oven loading crew can be occupied by attending progressively to the mold filling and loading of a group of ovens or vulcanizers. Also as the molds are cumbersome and unwieldy it is inconvenient and requires considerable special equipment to handle same and load them in the vulcanizer. Moreover, with the variations in time that necessarily occur in filling the batches of molds and loading them in the vulcanizers it is difficult to maintain the exact conditions of temperature and humidity that are essential to uniformity of product and, what is more important, this type of molding and vulcanizing equipment necessitates moving the filled molds at or about the critical time of sensitivity of the latex foam when lack of care in handling or unusual delay may impair the uniformity of the product or even spoil more or less of the batch.

On the other hand, the other type of equipment above mentioned which has been employed heretofore in making molded rubber articles, namely the individually heated molds, has definite disadvantages by reason of which it is not suitable for molding or vulcanizing latex foam articles. In the first place the provision of facilities for individually heating each mold adds greatly to the mold costs and practically precludes any appreciable salvaging of mold expense by remaking of molds into changed forms or sizes which may oftentimes be accomplished with the molds that are not individually heated. Furthermore, with the individually heated molds the necessary atmospheric conditions for rapid and uniform penetration of heat into the mass of latex foam and quick cure thereof, which as above pointed out is of paramount importance, are not obtainable and accordingly such molding and vulcanizing equipment, although it would eliminate the handling and moving of the molds to fill and load them in the vulcanizer and other disadvantages of the above first mentioned type of molding and vulcanizing equipment is entirely unsuited for latex foam molding and vulcanizing.

According to my invention a vulcanizing chamber is employed in which one or more molds are mounted, preferably removably, so that other and different molds may be substituted at will, the mold chamber being of suitable size to accommodate the largest size molds that would ordinarily be required and hence capable of accommodating molds of any smaller sizes. Thus the mold chamber is readily adaptable by mere change of molds to make cushions of a variety of sizes and shapes. The vulcanizer opens at each mold location, being arranged so that separation occurs substantially at the parting place of the mold sections which are preferably arranged to part and separate with the opening of the mold so that access to the interior of the vulcanizer affords convenient access at the same time to the interior of the mold. The opening and closing of the vulcanizer and molds is automatically accomplished, and at controlled times and when closed the vulcanizer, which is preferably insulated, affords a sealed enclosure to withstand substantial pressure and maintain in the vulcanizer an atmospheric condition as to pressure, temperature and humidity which is most favorable to rapid and uniform vulcanization.

Thus with my above mentioned equipment, molds of various sizes and shapes may be employed and the molds are filled in place in the vulcanizer so that no movement thereof occurs or is necessary after the filling and closing of the mold. Immediately upon pouring, the vulcanizer, which is self sealing, may be closed without any waiting or delay and the gelling and vulcanizing proceeded with at once. Vent openings are provided for evacuating the vulcanizer and also steam inlets which supply steam distributively at proper saturation and pressure and these openings or inlets are automatically operated under regulatable time control so that the articles in the molds not only are exposed in the vulcanizer to the exact conditions which I have found to effect exceedingly and surprisingly rapid cure, but also for the precise time to insure complete and perfect cure.

Among the conditions above mentioned which appear to contribute to the unusually rapid cure are elimination of air which would interfere with rapid and uniform dissemination of heat and perhaps have some detrimental drying effect—heating by direct application of wet steam which not only maintains the molded article in moist condition but also supplies heat rapidly and uniformly—and avoidance of evaporation which consumes heat that otherwise would contribute materially to vulcanization. Also special molds are employed with thin walls of high heat conductivity so that heat transmission therethrough is facilitated.

In addition, cooling facilities are provided and arranged to insure prompt cooling of the molds, after each vulcanizing operation, to the proper temperature for the next filling of the molds, thus avoiding any delay and contributing to perfection of product which is appreciably influenced by the temperature of the mold at pouring and up to commencement of vulcanization. Special lifting movement of the upper mold sections is also provided not only to avoid injury to the molded article in opening the mold but also to afford ample clearance for pouring, and the opening of the vulcanizer and mold is effected in successive stages to permit release of any adherence of the molded article to the mold sections which might cause tearing if the mold were opened without this precaution.

The object of my invention is, in general, to expedite and facilitate the production of molded articles of latex foam or the like with assurance of uniformity and perfection thereof. Other objects are to effect sufficient increase in the output from given equipment so that the equipment requirements are reasonably proportionate to the output; to avoid variations in production which may affect the serviceability and acceptability of the product; to avoid any movement or disturbance of the article from the time of pouring thereof until it is in a safe condition for handling; to provide equipment which is readily and economically adaptable to the making of articles of various shapes and sizes; and to permit continuity of production and positive control of the various conditions affecting the perfectness of the product so that the articles are produced rapidly without delays or loss of time and without necessitating the constant and exact supervision that has been required heretofore—these and other objects being accomplished as more fully explained hereinafter and as shown in the accompanying drawings in which:

Fig. 1 is a top or plan view of a vulcanizer constructed in accordance with my invention, this view showing the vulcanizer when closed;

Fig. 2 is an end view thereof of the closed vulcanizer;

Fig. 3 is a similar end view, but showing the vulcanizer in the open position;

Fig. 6 is a front view of one end portion of the vulcanizer with parts broken away and the operating mechanism at the end shown in section substantially on the line 6—6 of Fig. 2;

Fig. 7 is an enlarged detail view on the line 7—7 of Fig. 6 showing one of the vulcanizer closing springs;

Fig. 8 is a top view showing end portions of two adjoining vulcanizers with cooling equipment for cooperation with each of the two vulcanizers;

Fig. 9 is a front view of the structure shown in Fig. 8 with the vulcanizers in the open position to permit cooling of the molds therein;

Fig. 10 is an end view of an open vulcanizer showing the arrangement of the cooling mechanism at the remote end thereof;

Fig. 11 is a fragmentary detail perspective view of an outlet from the cooling device; and Fig. 12 is a diagrammatic view illustrative of controls by which operation of the press is accomplished.

Figure 4:
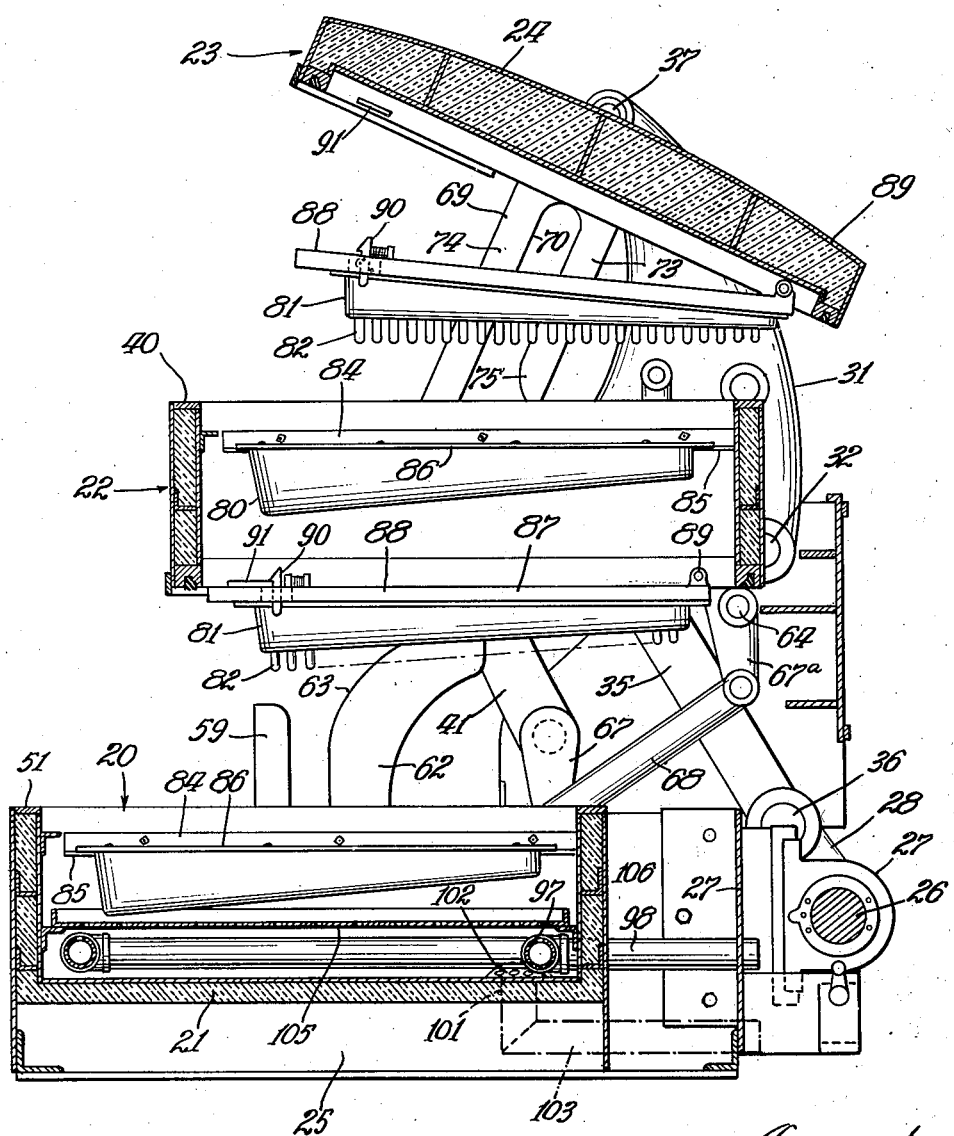
Fig. 4 is a sectional view taken substantially on the line 4—4 of Fig. 1, but showing the vulcanizer in the open position of Fig. 3.

For illustrative purposes a preferred embodiment of the invention is shown comprising a double deck vulcanizer wherein there are two superposed mold levels at each of which one or more molds is accommodated, depending upon the size thereof, the molds being arranged to open and close with the opening and closing movements of the vulcanizer, and each mold being conveniently accessible for filling and removal of the molded article when the vulcanizer is open.

This double deck vulcanizer comprises a bottom section 20 with bottom wall 21, a middle section 22 which is open at the top and bottom, and a cover section 23 with top wall 24, which said sections close together in superposed relation to form a closed chamber and are separable from one another so as to afford access between the top and middle sections and between the middle and bottom sections, appropriate mechanism being provided which is operable to separate and close together the sections as here required.

The bottom section 20 is built into the base 25 of the vulcanizer and this combined base and bottom section is secured directly to the floor or other foundation and carries the mechanism by which the vulcanizer sections are opened and closed. This mechanism comprises duplicate mechanisms at the opposite ends of the vulcanizer operating correspondingly in unison from a main shaft 26, of two part construction as hereinafter pointed out, which extends lengthwise of the vulcanizer at the rear of the bottom section 20 and is journaled in bearings 27 rigidly secured to the vulcanizer base 25, at the opposite ends respectively thereof. Each end of the shaft 26 is provided, immediately beyond the respective bearing 27, with a correspondingly positioned crank 28 for operating the duplicate mechanism at that end of the vulcanizer, the so-called duplicate mechanism at each end being contained in a housing which is a rigid part of the combined base 25 and vulcanizer section 20 and has an inner portion 29 and an outer guard plate portion 30 which support parts of the vulcanizer opening and closing mechanism at the respective end of the vulcanizer.

Each said duplicate mechanism has an arm 31 with trunnions 32 at one end engaged in bearings 33 of the housing portions 29 and 30 and each arm 31 has a lateral extension at this trunnioned end pivotally connected at 34 to the end of a link 35, the other end of which engages the pivot pin 36 of the respective crank 28 by which the arm 31 swings in its pivotal mounting 33. The end of the arm 31 remote from the pivotal mounting 33 is pivoted at 37 to the end of a short link 38, the other end of which is pivoted at 39 to the respective end of the top or cover section 23 of the vulcanizer, the arrangement being such that when the two cranks 28 are in the upward dead center position with respect to their links 35 as shown in Fig. 3, the cover section 23 of the vulcanizer is lifted thereby from the middle section 22 as shown in said figure whereas when the cranks 28 are in the opposite dead center position with respect to their links 35 as shown in Fig. 2 the cover section 23 is closed down tightly against the surrounding top margin 40 of the middle section 22 as shown in said Fig. 2.

Another arm 41 has trunnions 42 at one end engaged in bearings 43 of the housing portions 29 and 30 and the opposite end of this arm 41 is pivotally connected at 44 to one end of a link 45 which has the other end pivoted at 46 to the respective end of the middle section 22 and this arm 41 has a lateral extension 47 the outer end of which is pivoted at 48 to one end of a link 49, the opposite end of which is pivoted at 50 to the outer side of the respective arm 31 between the pivots 32 and 37 thereof so that swinging of the arm 31 imparts through the link 49 a somewhat similar swinging movement to the arm 41, the arrangement being such that when the cover section 23 of the vulcanizer is lifted to the elevated position by the arms 31 as shown in Fig. 3, the latter arms cause a simultaneous movement of the arms 41 so that they lift the middle section 22 from the lower section 20 to a position approximately half way between the raised cover 23 and the bottom section 20 as shown in Fig. 3. Movement of the arms 31 to close the cover section 23 against the middle section 22 in like manner imparts movement to the arms 41 to simultaneously close the middle section 22 down tightly against the surrounding top margin 51 of the bottom section 20 as shown in Fig. 2.

To impose a tension on the cover section 23 to hold it tightly closed against the middle section 22 and to impose a like tension on the middle section 22 to hold it tightly closed against the bottom section 20, the outer trunnion 32 of each arm 31 and the outer trunnion 42 of each arm 41 has a strong spring 52 attached thereto as shown at 53 in Fig. 7 and coiled therearound with the outer end anchored to a pin 54 of the housing guard plate portion 30 so as to impose sufficient tension to hold the sections 23, 22 and 29 tightly closed together in the closed position of the vulcanizer.

Furthermore each section 23 and 22 has around its inner margin a sealing strip channel 55 containing a sealing strip 56 of resilient material, such as rubber, which projects sufficiently from said channel 55 so as to tightly compress against the respective top margin 40 or 51 of the opposed under section 22 or 20 and seal the joint so that substantial pressure may be employed and maintained within the interior of the vulcanizer. All of the walls of the vulcanizer are also insulated so that desired temperatures for vulcanization may also be maintained in the closed vulcanizer.

Since the pivotal axis of the trunnions 42 is well in advance of the pivotal axis of the trunnions 32 the opening movements of the cover section 23 and the middle section 22 is such that the middle section 22 when raised swings a substantial distance rearwardly from the front of the bottom section 20, as shown in Figs. 3 and 4, so that overhead access is provided to the interior of the lower vulcanizer section 20 which is desirable to facilitate pouring into the mold pan with which the bottom section is provided, and at the same time the cover section 23 when raised swings a somewhat similar distance rearward from the front of the middle section 22 to permit similar access to a mold pan in the middle section 22.

For reasons hereinafter more fully explained it is desirable that in the opening movements of the sections 23 and 22 each of these sections should be lifted perpendicularly from the section immediately below in a substantial portion of its initial opening movement and it is for the purpose of permitting this initial perpendicular or straight line movement that the arms 31 and 25 are connected to their respective vulcanizer sections 23 and 22 by the links 38 and 45.

Figure 5:
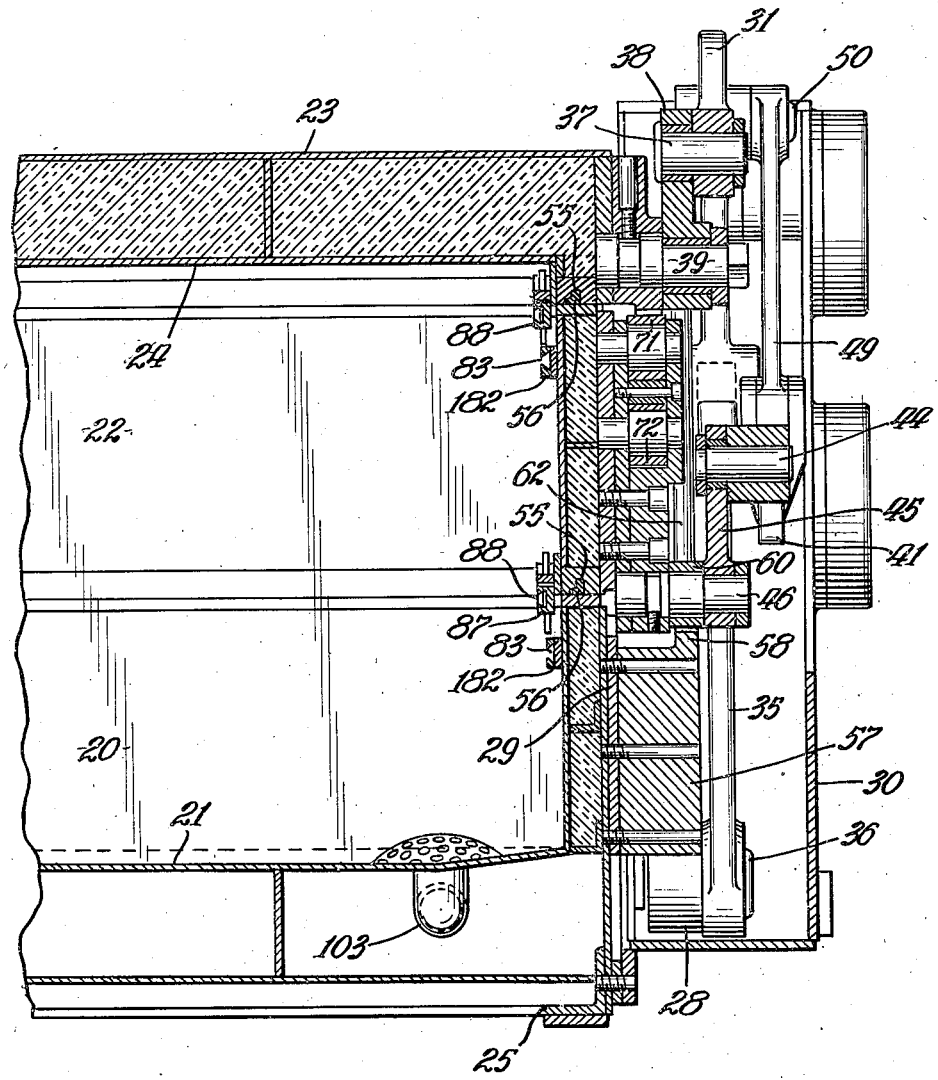
Fig. 5 is a longitudinal vertical sectional view through one end portion of the vulcanizer, taken substantially on the line 5—5 of Fig. 2.

To impart this initial perpendicular movement to the sections 23 and 22 the top and bottom sections 23 and 20 are provided at each end with guides which cooperate with rollers on the ends of the middle section 22, the guides of the lower section 20 which are indicated at 57 being rigidly secured to the combined base 25 and bottom section 20 and each having a plate like portion 58 extending upwardly in outwardly spaced relation from the respective end of the section 20 as shown in Fig. 5 and provided with a vertical notch 59 to accommodate a roller 60 on the lower pivot 46 of the link 45, said roller 60 being interposed between the lower end of the link 45 and the mounting boss 61 of the pivot pin 46 (see Fig. 5).

The upper end or mouth of the notch 59 is flared as shown in Fig. 3 to facilitate entry of the rollers 60 into the notch and at the rear side of the notch the plate 58 is formed with a cam extension 62 having a curved guiding edge 63 along which the roller 60 operates after it leaves the notch 59, the length of the curved guiding edge 63 being such that in the fully raised position of the middle section 22 the roller 60 does not leave the cam 62.

Thus as the arms 41 swing the middle section 22 to the raised position the engagement of the rollers 60 with the notches 59 imparts a perpendicular movement to the section throughout the length of the slots 59, the links 45 swinging at the time on their pivots 44 to allow such perpendicular or straight line movement, and when the top of the notches 59 are reached, the rollers 60 ride rearwardly and upwardly along the cam edges 63 permitting the section 22 then to retract rearwardly to the stepped back position shown in Figs. 3 and 4 permitting overhead access to the front of the bottom section 20.

It will be observed that the links 38 and 45 are pivoted to their respective sections 22 and 23 substantially midway between the front and rear thereof so that these sections are suspended from the links in substantially a balanced manner, and of course as these sections are free to swing on their respective pivots 46 and 39, precautions are desirable to avoid undesirable pivotal movement. This is accomplished in the case of the middle section 22 by a parallel link and lever arrangement at each end of the section comprising companion links 45ª and levers 41ª paralleling the links 45 and arms or levers 41 respectively, the lever 41ª being pivoted at 64 to the housing portion 29 and the link 45ª being pivoted at its upper end to the outer end of the lever or arm 41ª as at 65, and at its lower end to the end of the section 22 as at 66. Each arm 41 has an extension 67 beyond its pivot 42 and each lever or arm 41ª has a corresponding extension 67ª beyond its pivot 64 the outer ends of which said extensions 67 and 67ª are connected by a link 68 to cause the lever 41ª to swing in unison with the arm 41.

By reason of this parallel link and lever arrangement, swinging of the section 22 on its supporting links 45 is controlled and the present arrangement is such that the section is maintained horizontal and parallel to the section 20 in all positions of its opening and closing movement. It will be noted that in the closed position of the vulcanizer the link 45ª swings down to a position against the upper end of the cam extension 62 which has an upright terminal face 62ª against which the link 45ª moves laterally when the section 22 is closed down against the section 20.

The upper or cover section 23 also has a guide at each end consisting of a forked plate 69 with a long slot 70 which engages a pair of vertically spaced rollers 71 and 72 on the respective end of the middle section 22, the rollers 71 and 72 serving to hold the guide 69 in upright position and the section 23 parallel with the section 22 so long as both rollers are engaged in the slot 70.

The rear arm 73 of each guide 69 is shorter than the front arm 74 thereof and is removed from engagement with both rollers 71 and 72 after the upper section 23 has been lifted a substantial distance from the middle section 22 whereas the front arm 74 is of sufficient length to remain engaged with the upper roller 71 at all times. By reason of this differential length of the arms 73 and 74 a direct upward straight line lift is imparted to the section 23 during the initial portion of its opening movement after which the freeing of the arm 73 from the lower roller 72 permits the section 23 to begin a rearward tilting which continues after the arm 73 is withdrawn from engagement with the upper roller 71 and is caused by the continuing engagement of the arm 74 with the upper roller 71 and the rearward pull of the arms 31 on the section 23. The lower end of the arm 73 is curved as at 75 to facilitate entrance of the rollers 71 and 72 in the notch 70 and this curved formation also serves to control the tilting of the section 23 and cause a gradual shifting of the section 23 to and from its position of parallelism with the section 22 in the closing and opening movements respectively of the section 23.

Thus in the opening of the vulcanizer each section 23 and 22 is simultaneously lifted, the rate of lift of the section 23 being substantially twice that of the section 22 so that as the section 22 is lifted from the section 20 the section 23 is being lifted substantially an equal distance from the section 22, the lifting movement of both sections 23 and 22 being perpendicularly from the section immediately therebelow during a substantial initial portion of the lifting movement thereof and the section 22 after its initial perpendicular movement being stepped rearwardly with respect to the lower section 20 and the section 23 after its initial perpendicular movement being stepped rearwardly and tilted with respect to the section 22 so that overhead access is afforded to the forward portions of both sections 22 and 20.

For operating the shaft 26 to impart the opening and closing movements to the sections 23 and 22 any convenient source of power may be employed, preferably an electric motor 76 connected through a suitable reduction gearing 77 with the shaft 26 to operate the latter at a relatively low speed. This motor and reduction gearing may be combined in a unit which is secured as at 78 to the rear of the vulcanizer base 25 and has a double ended output shaft 79 in line with the two sections of the shaft 26, which as aforesaid is preferably divided, each section of the shaft 26 being coupled at its inner end to the corresponding end of the shaft 79.

A braking device is provided which acts upon discontinuance of operation of the motor 76 to impose a braking action on the output shaft 79 to stop operation of the latter promptly and avoid overrunning, the braking device not being shown or explained in detail as such braking devices are well known, and the motor 76 is controlled to permit accurate stopping thereof upon completion of the closing movement of the vulcanizer and upon completion of the opening movement thereof as well.

This vulcanizer is of suitable size or horizontal dimensions to accommodate therein molds of the largest size contemplated, as for example molds for making automobile cushions of the usual lengths and widths, two of such molds being shown in place in the illustrated embodiment. Such cushions as above indicated are usually formed with a large number of elongated openings extending upwardly in the cushion body nearly to the top thereof and in making such cushions a lower mold section or pan 80 of cushion shape is usually employed into which the foamed latex is poured and this mold has a cover section 81 which closes down against the surrounding margin of the pan 80 and is provided with depending hollow cores 82 arranged to extend an appropriate distance into the pan 80 to form the required openings in the cushion. The two molds employed in the present embodiment are located in the vulcanizer one above the other, the upper mold being at a level approximately at the place of parting of the sections 23 and 22, and the top section 81 of each mold is arranged to be separated from its corresponding pan 80 in the opening movement of the vulcanizer and to close together in molding position against its corresponding pan when the vulcanizer is closed.

These molds are removably mounted in the vulcanizer so that molds of various sizes and shapes may be readily installed to optionally make cushions of any desired sizes or shapes within the dimensions of the vulcanizer, the pans 80 of the two molds being located respectively near the top of the middle section 22 and near the top of the lower section 20 and the top sections 81 of the molds being located respectively at the bottom of the cover section 23 and at the bottom of the middle section 22 so that the top sections 81 of the molds move respectively with the cover section 23 and the middle section 22 to and from its mating mold section 80 in the opening and closing movement of the vulcanizer.

For mounting the mold pans 80, any suitable mounting facilities permitting removability and adjustability of the pans may be employed, each section 22 and 20 being provided in the illustrated embodiment with a rail 182 at each end which is secured to the inner side of the respective end wall and provided with a dovetailed groove 83 along the inner face thereof to accommodate brackets, bolts or other suitable fastenings or fittings that may be required to mount the particular mold pans, it being understood of course that such brackets or fittings are adjustable along the groove 83 and may be secured in adjusted positions to position the mold pan in the desired location.

In the present embodiment an angle iron 84 is secured to each rail 182 with a flange 85 extending inwardly and the pan 80, which is long enough to be mounted directly on these angle irons 84, has an outturned marginal flange 86 therearound, the portions of which at the opposite ends of the pan 80 rest on and are secured to the angle iron flanges 85 as will be readily understood. Rails of angle iron or other form may extend lengthwise of the vulcanizer chamber between the opposed grooved rails 182 and have end formations or fittings by which they are adjustably secured at their ends in the dovetail grooves 83 so that one longitudinal rail may be located near the front of the vulcanizer chamber and the other near the rear in selected spaced relation from one another and these longitudinally extending spaced rails may have a number of small mold pans, such as those for individual seat or chair cushions, mounted thereon in adjoining relation lengthwise of the vulcanizer.

Thus it will be understood that the grooved rails 182 or other similar supporting means that may be provided for the mold pans afford in effect universal and adjustable mounting facilities by reason of which mold pans of various shapes and sizes may be readily mounted in any selected or appropriate position in the top of the section 22 and likewise in the top of the section 20.

Similar rails 87 with dovetailed grooves 88 along the inner sides are provided at the opposite ends of the sections 23 and 22 at the bottom thereof to support the top or core sections 81 of the molds, these rails 87 however not being fixed in place but each pivoted at its rear end to the respective sections 23 and 22 as indicated at 89 and provided near its forward end with a spring pressed latch 90 engageable with a latch lug 91 on the corresponding end wall of the section 23 or 22 whereby the rails 87 may be latched in parallel relation to the bottom plane of the section 23 or 22 or may be released to swing downwardly therefrom.

These rails 87 likewise permit mounting thereon of the top sections of molds of various sizes and shapes and they also permit adjustable mounting thereof by which the top section of each mold may be positioned to register accurately with and close properly against the mating mold pan therebelow, and it is to be understood that when top mold sections 81 are properly mounted on the rails 87 and the latter latched in the normal upraised position the mold section 81 that is mounted at the bottom of the vulcanizer section 22 registers with the mold pan 80 in the top of the lower section 20 when the two sections 22 and 20 are closed together and that the mold section 81 is lifted out of and away from its mating pan 80 when the section 22 is lifted from the section 20. Likewise the top section 81 of the upper mold moves to and from its mating pan 80 upon movement of the top section 23 to and from the middle section 22.

Assuming that the vulcanizer is open as shown in Figs. 3 and 4 with the mold pans 80 in place and the mold sections 81 latched up in position at the bottom of the respective sections 22 and 23, a measured quantity of latex foam is poured in each pan 80 sufficient so that when the upper core sections 81 are closed against the pans 80 with the cores 82 projecting downwardly into the pans 80 and into the latex foam therein, the latex foam will completely fill the mold space and assume therein the shape that is to be imparted to the finished cushion.

The motor 76 is then operated to rotate the shaft 26 a half turn whereby the vulcanizer is closed with the top section 23 sealingly engaged against the surrounding top margin of the middle section 22 and the latter section sealingly engaged with the surrounding top margin of the bottom section 20 so that a closed pressure chamber is provided containing the molds 80—81 which are then closed. The latex foam in the molds is then vulcanized while the vulcanizer is closed and after vulcanization thereof the shaft 26 is again rotated a farther half turn and thereby opens the vulcanizer and at the same time opens the molds whereupon the vulcanized cushions are removed from the molds and the molds refilled.

Because of the cores 82 projecting downwardly into the vulcanized mass of latex foam in the pans 80 it is important to separate each top mold section 81 from its mating pan 80 in the direction of the longitudinal axes of the cores 82 so as to avoid tearing or mutilation of the molded cushion body and it is for this reason that the opening and closing mechanism for the vulcanizer is arranged, as hereinbefore explained, to impart an initial perpendicular movement to each section 23 and 22 as the vulcanizer opens, this initial perpendicular movement being of sufficient extent to lift the cores entirely from the vulcanized body of latex foam in the respective mold pan 80 before any lateral or tilting movement of the core section 81 occurs.

For vulcanizing the latex foam in the molds 80—81 wet steam is employed and the vulcanizing chamber filled therewith at a definite pressure, approximately three pounds, to afford the required temperature, approximately 220° F. to vulcanize the latex foam, the wet steam being employed not only because it is an especially effective heating medium but also to preserve the latex foam in a moist condition in which heat penetration is especially rapid. Moreover it is important to maintain the prescribed pressure so as to avoid any evaporation of water that may be present in the chamber or latex compound as such evaporation not only robs the vulcanizing operation of substantial amounts of heat which otherwise would expedite the cure but also lessens the heat conductivity of the latex foam.

Also, the molds 80—81 are of special construction as above pointed out, being made with thin walls of high heat conductivity in accordance with the disclosure in application Serial No. 319,234, filed February 16, 1940, by myself and Herbert C. Erich and Marion M. Cunningham so that heat transmission therethrough is rapid and it is to be understood that these molds are not sealed but the top section 81 has a somewhat loose closing relation with the pan 80 and moreover the top section is provided throughout its area with numerous small vent openings.

Steam is furnished to the vulcanizer from any suitable wet steam source through a pressure regulator and a valve 92 (see Fig. 12) to a pair of inlets 93 which are connected to the opposite ends respectively of a pipe loop 94, the middle length 95 of which is located along the front wall of the vulcanizer near the bottom and has numerous upwardly facing openings 96 at intervals therealong through which the steam is discharged into the vulcanizer chamber distributively throughout the length thereof.

The steam pressure regulator is not shown or described as such pressure regulators are well known and are adjustable to supply steam at any selected pressure and it will be understood that by setting the pressure regulator at a certain selected pressure the pressure of steam supplied to the vulcanizer is thereby controlled so as to maintain a pressure of steam in the vulcanizer at the selected pressure. Thus if the pressure regulator is set at three pounds the steam in the vulcanizer will be maintained at the three pounds pressure.

It is important, as above pointed out, to evacuate the air from the vulcanizer so that the vulcanizing chamber is completely filled with the wet steam and moreover it is important to relieve the steam pressure in the vulcanizer before the latter is opened to remove the vulcanized cushions from the molds 80—81. For this purpose a vent pipe 97 is provided along the rear of the vulcanizer chamber near the bottom thereof with a pair of outlets 98 leading therefrom and this pipe 97 has numerous openings 99 at intervals throughout its length and leading into the top thereof. The outlets 98 lead through a valve 100 (see Fig. 12) by which these vent facilities may be opened or closed as desired.

Moreover a drainage outlet 101 is provided with a screen 102 thereover and leading from the bottom of the section 20 as indicated at 103 to remove condensation which may accumulate in the vulcanizer and this drainage outlet is controlled by a check valve 104 (see Fig. 12) which is arranged to operate so as to permit water drainage when the vulcanizer is open but closes when the press is closed and steam is introduced therein.

The latex foam must be permitted or caused to gel before vulcanization is proceeded with and is compounded to set or gel in a minimum of time after pouring under the conditions existing in the vulcanizer when it is closed and before steam is admitted for vulcanizing. The best mold temperature for pouring is approximately at body heat or between 90° and 100° F. as a higher or lower temperature produces a poor skin structure on the cushion, and the latex foam is accordingly poured in the molds while the latter are at a temperature between 90° and 100° F., these molds being preferably artificially cooled when the vulcanizer is opened so that the proper pouring temperature thereof is attained during the time required to strip the vulcanized cushions from the molds and clean the molds for the next molding operation.

The vulcanizer itself in its walls and elsewhere retains residue heat from the previous vulcanizing operation which is imparted to the mold and its contents when the vulcanizer is closed, and the latex is compounded so that this residue heat in addition to that remaining in the molds causes the latex to gel promptly upon closing the vulcanizer within a period of five minutes thereafter during which the introduction of steam is delayed.

In the making of cushions or other articles of latex foam with this equipment a certain cycle of operations takes place. First, starting with the vulcanizer open as shown in Figs. 3 and 4 and both molds open as shown in Fig. 3 and cooled to the required pouring temperature, the proper amount of latex foam is poured into the pan 80 of each mold. Then the shaft 26 is operated to close the vulcanizer as shown in Fig. 2 and with the closing of the vulcanizer each of the mold core sections 81 is simultaneously closed down in proper molding position relative to its mating mold pan 80 so that the cores 82 project downwardly into the mold pan and into the latex foam therein and the latter then completely fills the mold and is ready for gelling and vulcanizing.

After the vulcanizer has been thus closed the vulcanization is not immediately proceeded with but the latex foam in the molds is first allowed to set or gel in the mold form, such setting or gelling being caused to occur on account of the nature of the compound and the relativeily mild heating thereof which occurs upon closing the vulcanizer due to residue heat accumulated in the walls of the vulcanizer and elsewhere in the previous vulcanizing operation. A period of five minutes is ample allowance to insure setting or gelling.

At the conclusion of the five minute gelling period the vent valve 100 is opened and the steam inlet valve 92 also opened so that the incoming steam forces the air out of the vulcanizer chamber and the vent valve 100 is allowed to remain open until all of the air is exhausted and completely replaced with steam. Thereupon the vent valve 100 is closed and the steam supply valve 92 remains open until completion of the cure.

The time of closing the vent valve 100 may be determined by thermometer reading or the valve may be actuated automatically by thermostat control inasmuch as an appropriate time for closing the vent is when the temperature in the vulcanizer reaches 212° F. Since, however, with other conditions constant, such as the pressure and rate of steam supply, the size of the vulcanizer chamber and the rate of exhaust or venting, as they are in the present case, the time required to evacuate the air and fill the chamber with steam is uniform, the closing of the vent valve 100 may be governed or controlled by lapse of time, the present equipment, made in accordance with my invention, being arranged so that air evacuation and filling with steam is accomplished within three minutes.

Upon the closing of the vent valve 100 the steam pressure in the vulcanizer rises to the pressure for which the steam pressure regulator is set, for example three pounds as suggested above, and the steam pressure is maintained in the vulcanizer for the length of time required to properly vulcanize or cure the latex foam in the molds. Due to the temperature of approximately 220° F. which is maintained in the vulcanizer by the steam pressure, the wet condition of the steam, the absence of any air, the rapid transmission of heat through the special mold, the cure is effected in the remarkably short time of approximately twenty minutes, so that the total time from the closing of the vulcanizer to the completion of the cure is approximately twenty-eight minutes.

It will be understood, of course, that the drainage check valve 104 (see Fig. 12) is closed during the vulcanizing period above mentioned and only opens or is opened at such time as there is no pressure in the vulcanizer chamber so as to permit drainage of any water that may collect in the bottom of the section 20.

At the end of the curing period of twenty minutes the steam valve 92 is closed and the vent valve 100 immediately opened to relieve the pressure in the vulcanizer and restore therein atmospheric pressure at which the vulcanizer may safely be opened, which relief of pressure occurs quite quickly, whereupon the shaft 26 is advanced a half turn thereby opening the vulcanizer and at the same time opening both molds 80—81.

Because of the moist condition maintained in the vulcanizer during vulcanization and the moist condition of the latex foam thus insured, the mold sections usually separate quite readily from the vulcanized article. As a precautionary measure, however, to avoid tearing or damage to the cushions which might occur on account of adherence or sticking of the molded cushion at some places in the mold sections, the vulcanizer is preferably arranged to first open only part way or sufficiently so that the operator may reach in and free the cushion from the mold sections, after which the opening movement is resumed and the vulcanizer fully opened. Thereupon the molded cushions are removed and the vulcanizer and molds prepared for the next pouring.

In the molding of these articles, more or less of the latex foam usually extrudes from the mold cavity between the mold pan and core section and also through the vent holes heretofore referred to as provided in the core section 81, and when the vulcanized cushions are removed from the molds, extruded portions remain on or attached to the mold sections. These must be removed and the molds cleaned before pouring and it is for the purpose of permitting access to the tops of the mold sections 81 for cleaning that these top sections 81 are mounted on the hinged rails 87 and releasably held in place. With the hinge and latch arrangement, the latches 90 are merely released thereby permitting the sections 81 of the molds to swing downwardly as the upper mold is shown in Fig. 4, so that the top of the mold sections 81 may be cleaned, after which the sections 81 are swung up and latched in place.

Obviously in cleaning the molds, scraps of the extruded vulcanized latex foam may fall down into the bottom section 20 of the vulcanizer and might collect around the strainer 102 and interfere with drainage. Accordingly it is preferred to provide in the bottom section 20 below the mold section 80 a perforated pan 105, removably resting on angle irons 106 on the surrounding walls of said section to collect any scraps that may fall down into the bottom section 20, and this perforated pan, which is above the steam inlet pipe 95 serves also to distributively spread the supplied steam to the vulcanizer space thereabove. Incidentally it is also important before closing the vulcanizer to carefully clean the top margins 40 and 51 of the vulcanizer sections 22 and 20 to make sure that there are no scraps or other particles thereon which would interfere with sealing thereagainst of the sealing strips 56 of the sections 23 and 22 respectively.

For cooling molds 80—81 after the vulcanizer is opened, and also to some extent to cool the atmosphere in which the operator is necessarily required to work in attending to the molds, cooling facilities are provided at each end of the vulcanizer. Such cooling facilities comprise a duct 107 leading from some source of supply of cooled air under pressure and preferably refrigerated, said duct terminating in outlets 108 and 109 located at proper elevations and with proper directional facilities to blow cooled air against the mold sections 80 and 81 of both molds when the vulcanizer is open. Accordingly there is a cooled air outlet 108 from the duct 107 arranged as shown in Fig. 9 at an elevation to discharge into the opening between the raised sections 23 and 22 and another outlet 109 arranged at an elevation to discharge into the opening between the sections 22 and 20, there being a set of such outlets 108 and 109 at each end of the vulcanizer near the front thereof. Each outlet 108 is divided and provided with upper and lower baffles or vanes 110 and 111 respectively as shown in Figs. 9 and 10, the upper baffles 110 being arranged obliquely and turned rearward slightly so as to direct substantially half the cooled air from the outlet 108 distributively against the nearest half of the underside of the upraised mold section 81 of the upper mold and the other baffles 111 being downwardly inclined so as to direct the other half of the cooled air from the outlet 108 distributively against the top of and into the nearest half of the mold pan 80 of the upper mold.

The lower outlet 109 is set somewhat forwardly of the upper outlet 108 as shown in Fig. 10 and is divided as shown in Fig. 8 into a rear outlet portion 112 and a front outlet portion 113, the rear outlet portion 112 being arranged to direct the cooled air therefrom somewhat upwardly against the underside of the nearest half of the upraised section 81 of the lower mold while the front outlet portion 113 has baffles 114 arranged to direct the cooled air therefrom against the top of and into the nearest half of the mold pan 80 of the lower mold. Dampers 115 and 116 are provided in the outlets 108 and 109 respectively, simultaneously operable by a connecting rod 115ᵃ which has a handle 116ᵃ for manual manipulation so that the operator can control the supply of cooling air at will.

In practice, batteries of these vulcanizers are provided arranged in spaced end to end relation, and between adjoining vulcanizers, a single duct is preferably provided with a pair of outlets 108 and 109 at one side to service the vulcanizer at that side and a pair of similar outlets 108 and 109 at the opposite side to service the vulcanizer at the latter side as will be readily understood from the illustration thereof in Figs. 8 and 9.

Control of the various operations of the vulcanizer may be accomplished manually if desired, but it is highly desirable and preferable to employ controls which cause the operations to be performed automatically in proper sequence and exact timed relation to insure accuracy and uniformity of treatment without any factors of uncertainty or necessity for close supervision.

Various forms of controls and timing arrangements may be employed as for example, temperature control may be utilized to operate the vent valve 106 as I have suggested above, and the drainage valve 104 might be controlled by temperature change or in timed relation with other operations, a relatively simple form of time control being shown herein, however, for illustrative purposes wherein the various operations occur in selected time relation which may be regulated by adjustment of the timing instrumentalities to cause the operations to occur at selected times and to continue for selected periods of time as may be required.

In the time control which is shown diagrammatically in Fig. 12 a timer shaft 117 which carries a series of control disks 118, 119, 120 and 121 is rotated slowly by a variable speed motor 122, a suitable speed controller 123 being provided by which the speed of the motor 122 may be varied as required for increasing or decreasing the speed of operation of the shaft 117 to vary the length of time for the cycle of operations that are to occur, it being understood that in each rotation of the shaft 117 a complete cycle of operations occurs. A constant speed motor 122 of course could be employed without any speed controller 123 and a variable speed gearing interposed between the motor 122 and shaft 117 to provide the desired variations in speed of the shaft 117.

A three wire feed, the conductors of which are indicated at 124, 125 and 126, supplies current to the three phase motor 76 through a three leaf switch 127 the three leaves of which are operable conjointly in unison by the disk 121 to make connections of the conductors 124, 125 and 126 with conductors 128, 129 and 130 respectively which lead directly to the motor 76. A cam follower 131 is provided which cooperates with the periphery of the desk 121 to control the opening and closing of the switch 127 and this disk has a notch 132 in which the cam follower 131 is located when the vulcanizer is in its open position, at which time the switch 127 is open and no current is supplied to the motor 76 and the latter is idle.

Two conductors 133 and 134 lead respectively from the feed wires 125 and 126 to supply current to the motor 122 and to solenoids hereinafter described, the conductor 134 leading to the controller 123 which is connected to the motor 122 and the other conductor 133 leading through a switch 135 to the motor 122. The switch 135 is controlled by a cam follower 136 which cooperates with the periphery of the disk 118 and the latter has a notch 137 arranged with respect to the notch 132 of the disk 121 so that the cam follower 136 is in its notch 137 at the same time that the cam follower 131 is in the notch 132 and when the cam follower 136 is in the notch 137 the switch 135 is open and no current is supplied therethrough to the motor 122.

However a jumper 138 controlled by a push button switch 139 is provided to by-pass the switch 135 and provide a connection of the conductor 133 to the motor 122 so long as the push button switch 139 is held in the closed position. Thus the motor 122 can be operated while the switch 135 is open and of course when the motor 122 is operated the shaft 117 and all the disks 118, 119, 120 and 121 are rotated.

The disk 118 is of such shape that in all positions of rotation thereof the switch 135 remains closed except when the cam follower 136 is opposite the notch 137 or opposite another similar notch 140 which is located near to the notch 137 and is reached when the disk has made almost a complete revolution from the position in which the notch 137 is engaged by the cam follower 136. Thus when the shaft 117 and disks 118—121 are in the idle position shown in Fig. 12 with the cam follower 136 engaged in the notch 137, the motor 122 may be started by temporarily pressing the push button switch 139, whereupon the disk 118 starts turning thereby moving the notch 137 away from its cam follower 136 and closing the switch 135 which remains closed and continues the operation of the motor 122 until the disk 118 has made almost a complete revolution and the cam follower 136 seats in the notch 140, whereupon the switch 135 opens and the motor 122 becomes idle until the push button 139 is again pressed. When the push button is then pressed again the motor 122 again starts and the cam follower 136 is lifted out of the notch 140 and engages the intervening rise 141 which holds the switch 135 closed and continues the operation of the motor 122 for the relatively short interval until the notch 137 arrives at the location of the cam follower 136 which then retracts into the notch 137 and opens the switch 135, and of course the motor 122 then stops.

The disk 119 controls the vent valve 100 which is operated by a solenoid 142 which when energized closes said valve, said valve 100 being normally open and returnable to the normal open position whenever the solenoid is not energized.

The steam valve 92 on the contrary is normally closed and operable by a solenoid 143 under the control of disk 120 to open whenever the solenoid 143 is energized and this valve returns to the closed position when the solenoid is not energized.

Current is supplied to the vent valve solenoid 142 from the conductor 134 through a branch conductor 144 and from the conductor 133 through a branch conductor 145, switch 146 and conductor 147 and the switch 146 is controlled by the disk 119 through a cam follower 148 which cooperates with the periphery thereof.

In the normal inoperative position of the shaft 117 and disks 118—121 as shown in Fig. 12, at which time the vulcanizer is open, the cam follower 148 is opposite a low section 149 of the periphery of the disk 119 and the switch 146 is open and no current is supplied to the solenoid 142 and the vent valve 100 accordingly is open.

Current is supplied to the steam valve solenoid 143 from the conductor 134 through a branch conductor 150 and from the conductor 133 through a branch conductor 151, switch 152 and a conductor 153, and the switch 152 is controlled by the disk 120 through a cam follower 154 which cooperates with the periphery thereof.

In the normal inoperative position of the shaft 117 and disks 118—121 as shown in Fig. 12, at which time the vulcanizer is open, the cam follower 154 is opposite a low section 155 of the periphery of the disk 120 and the switch 152 is open and no current is supplied to the solenoid 143 and the steam valve 92 accordingly is closed.

The disk 121 which controls the operation of the motor 76 has a raised peripheral section 156 immediately beyond the notch 132 which comes into operation immediately after the shaft 117 and disk 118—121 start to rotate from the Fig. 12 position, and this rise 156 deflects the cam follower 131 to close the switch 127 and cause the motor 76 to operate to close the vulcanizer, this raised section 156 being of sufficient circumferential length to retain the switch 127 closed and continue the operation of the motor 76 only until the vulcanizer is closed at which time the raised section 156 passes beyond the cam follower 131 and the latter retracts into the low circumferential portion 157 of the disk 121 thereby opening the switch 127 and causing the motor 76 to stop with the vulcanizer closed.

The low circumferential portion 157 extends around the disk 121 nearly to the notch 132, a divided rise 158 being provided just ahead of the notch 132 which said rise 158 at the proper time, engages the cam follower 131 to close the switch 127 and operate the motor 76 to open the vulcanizer.

As before indicated it is desirable to only partially open the vulcanizer as a precaution so that the operator may release any adherence of the molded article to the mold sections before the vulcanizer is fully opened and for this reason the rise 158 is divided by a notch 159 which comes opposite the cam follower 131 when the vulcanizer is partially opened and permits the switch 127 to open and stop the motor in the partially open position of the vulcanizer.

The notch 140 of the disk 118 and the notch 159 of the disk 121 are arranged to come opposite their respective cam followers 136 and 131 at the same time so that when the notch 159 opens the switch 127 and stops the motor 76 the notch 140 likewise opens the switch 135 and stops the timer motor 122 thereby stopping the rotation of the shaft 117 and disks 118—121. Accordingly to complete the opening movement of the vulcanizer it is necessary for the operator to temporarily press the starter button 139 which starts the motor 122 and engages the front portion of the rise 158 of the disk 121 with the cam follower 131 and closes the switch 127 until the notch 132 is reached whereupon the switch 127 opens and the vulcanizer remains in the fully opened position. Thus it will be understood that the time the vulcanizer is partially opened is entirely under the control of the operator who accordingly can have whatever time may be necessary to free any adhesions or sticking of the molded article to the mold sections.

After the molds 80—81 have been filled and the vulcanizer has been closed by the rise 156 of the disk 121 and the motor 76 stopped by passage of the rise 156 beyond the cam follower 131, an interval of time is required for gelling, and accordingly the disks 119 and 120 are arranged to leave their cam followers 148 and 154 retracted and thereby leave the vent valve 100 open and the steam valve 92 closed until such gelling interval of five minutes as hereinbefore mentioned has elapsed after the closing of the vulcanizer.

At the end of this five minute interval the steam valve 92 is opened to supply steam to the closed vulcanizer while the vent valve continues to remain open for three minutes after the steam valve is opened and at the end of this three minutes period the vent valve 100 is closed.

The steam valve 92 then remains open and the vent valve 100 remains closed until just prior to the time that the vulcanizer opening rise 158 of the disk 121 reaches the cam follower 131, at which just prior time the steam valve 92 is closed and the vent valve 100 opened and it will be understood that these latter valve operations are caused to occur sufficiently in advance of the vulcanizer opening to insure relief of pressure in the vulcanizer before the vulcanizer is opened.

To effect the above operations of the valves 92 and 100, the disks 119 and 120, which continue to rotate slowly while the vulcanizer is closed, have raised peripheral portions 160 and 161 respectively, the latter of which reaches its cam follower 154 and opens the steam valve 92 five minutes after the rise 156 of the disk 121 has passed its cam follower 131, and three minutes thereafter, or eight minutes after the rise 156 of the disk 121 has passed its cam follower 131 the raised peripheral portion 160 of the disk 119 reaches its cam follower 148 and closes the vent valve 100.

These raised peripheral portions 160 and 161 are continued around the respective disks 119 and 120 to substantially coincidental terminations 160ª and 161ª, the latter preferably slightly ahead of the former, which said terminations reach their cam followers 148 and 154 a few minutes prior to the time that the rise 158 of the disk 121 reaches its cam follower 131, so that the steam valve 92 is closed and the vent valve 100 opened sufficiently before the vulcanizer opening by the rise 158 to insure atmospheric pressure in the vulcanizer before the latter is opened.

With this arrangement the raised peripheral portion 161ª is engaged with its cam follower 154 for twenty-three minutes to supply steam three minutes in advance of the closing of the vent valve 100 and thereafter to provide a three pounds pressure of steam in the vulcanizer for twenty minutes to cure the latex foam in the molds 80—81.

The speed of the motor is variable by the speed controller 123 as aforesaid so that the time of a cycle of operations may be increased or decreased as desired and the disks 118, 119, 120 and 121 may be plain circular disks with segments detachably or adjustably mounted thereon so that the times at which and the lengths of time during which the switches 135, 136, 152 and 127 or any of them are opened or closed may be regulated. For example, as shown in connection with the disk 120, the disk itself may be circular and have overlapping arcuate segments 162 and 163 at opposite sides respectively thereof, secured to the disk 120 by bolts 164 engaged through arcuate slots 165 of the segments so that the segments may be adjusted circumferentially to increase or decrease the length of the raised peripheral portion 161 or the place where such portion begins and ends.

Thus with the above vulcanizer and controls, after the molds 80—81 have been filled, the operator temporarily presses the push button 139 thereby starting the timer motor 122 and rotating the disks 118—121 which then act automatically to first close the vulcanizer, then, five minutes after the vulcanizer is closed, to introduce steam into the vulcanizer while the vent remains open for three minutes after which the vent is closed and the steam supply continued for twenty minutes whereupon the steam supply is discontinued and the vent opened and after a safe interval for reduction of pressure in the vulcanizer the vulcani~ is opened, all being done automatically and without any special skill or attention on the part of the operator. The total time for processing, exclusive of removing the vulcanized articles and cleaning and filling the molds and the slight delay for releasing any adhesions before the vulcanizer is fully opened amounts to only slightly in excess of twenty-eight minutes whereas vulcanizing alone has previously required approximately two hours with additional time required for removing the molded articles from the molds, cleaning and filling the molds and loading them into and removing them from the vulcanizer so that the output from the molds with the above described equipment is approximately six times or more greater than previously and with assurance of better and more uniform processing and less loss and wastage than heretofore.

For convenience in opening or closing the vulcanizer independently of the timing controls and also for setting the motor 76 at the exact open or closed position in synchronization with the timing controls, a reversing control 166 may be provided and it will be understood that by operation of this reversing switch the shaft 26 may be operated at any time and to any extent and that the timing controls are not disturbed thereby.

While I have shown and described my invention in a preferred form, I am aware that various changes and modifications may be made therein without departing from the principles of my invention, the scope of which is to be determined by the appended claim.

I claim as my invention:

In equipment of the class described, the combination of a mold, a vulcanizer having separable parts which close together to substantially seal the mold in the vulcanizer, said mold comprising separable parts which close together to form a covered mold cavity and which separate at substantially the place of separation of the vulcanizer parts, and means operable to supply a blast of cooled air between the separated separable parts of the vulcanizer against the separated parts of the mold therein, said last mentioned means including means for directing the air upward against one part of the mold and downward against the other part thereof.

EUGENE AUGUSTUS LUXENBERGER.